Oct. 12, 1943.  H. J. GRAHAM  2,331,773
CURRENT REGULATING APPARATUS FOR ELECTRIC ARC WELDING CIRCUITS
Filed June 16, 1942  2 Sheets-Sheet 1
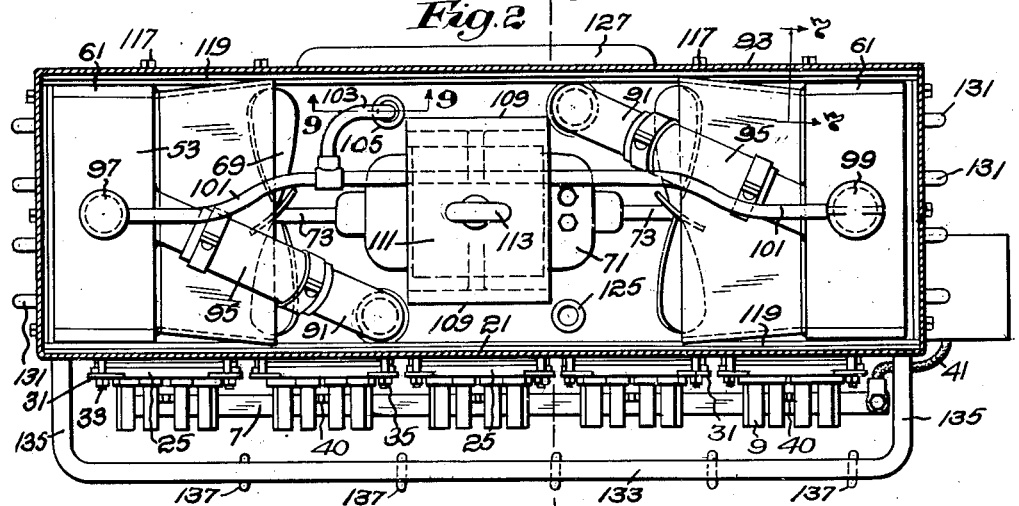
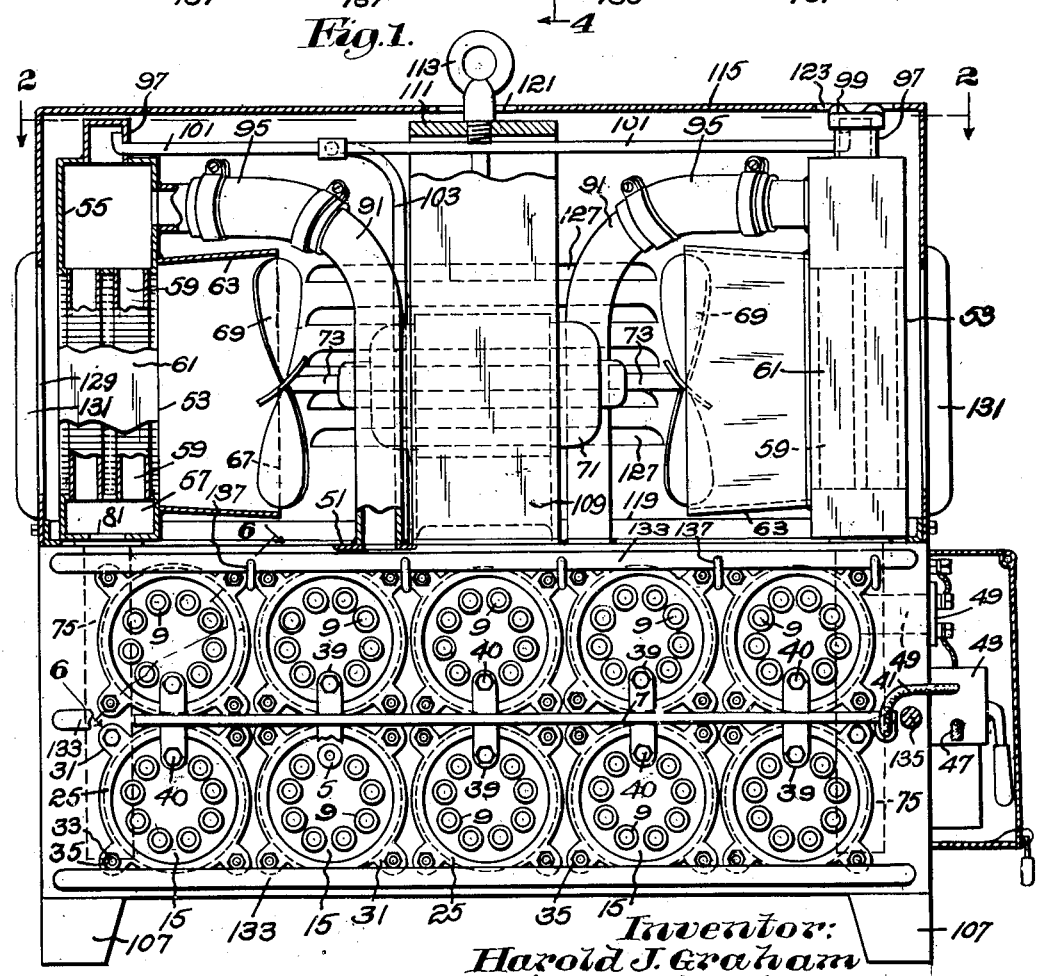
Inventor:
Harold J. Graham Oct. 12, 1943.  H. J. GRAHAM  2,331,773
CURRENT REGULATING APPARATUS FOR ELECTRIC ARC WELDING CIRCUITS
Filed June 16, 1942  2 Sheets-Sheet 2
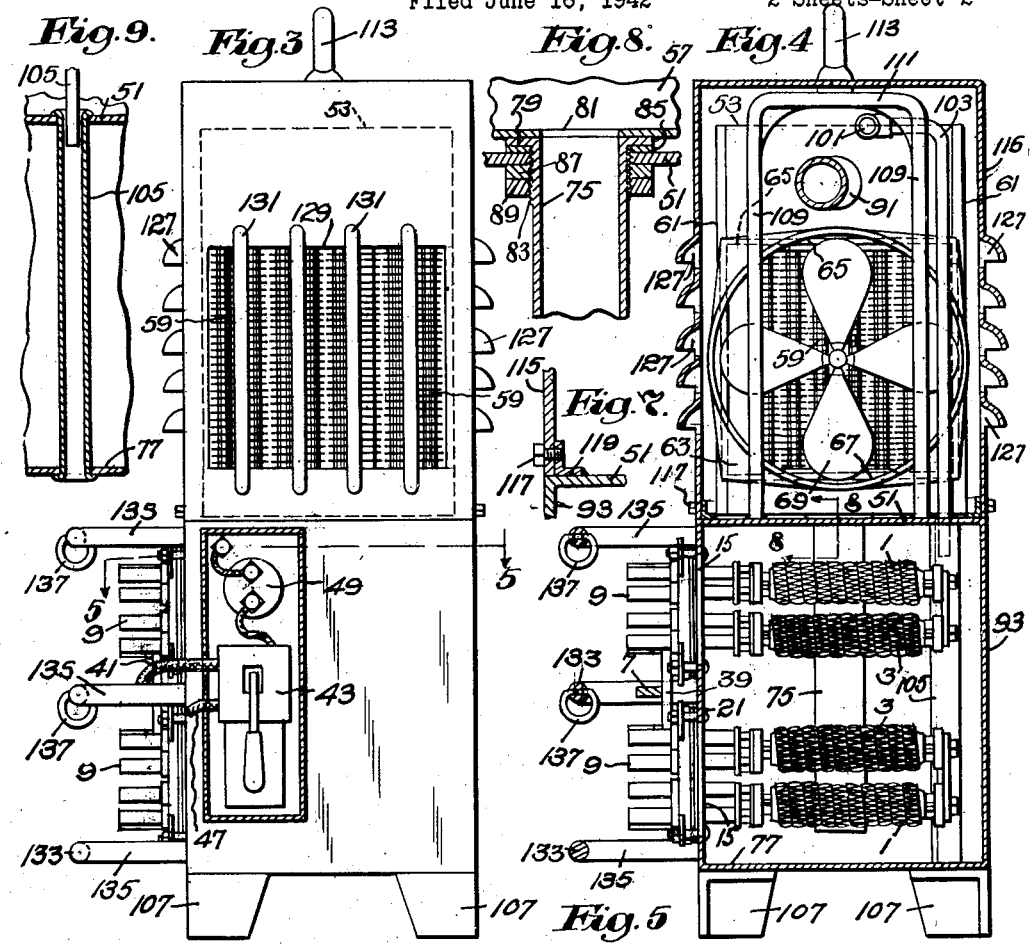
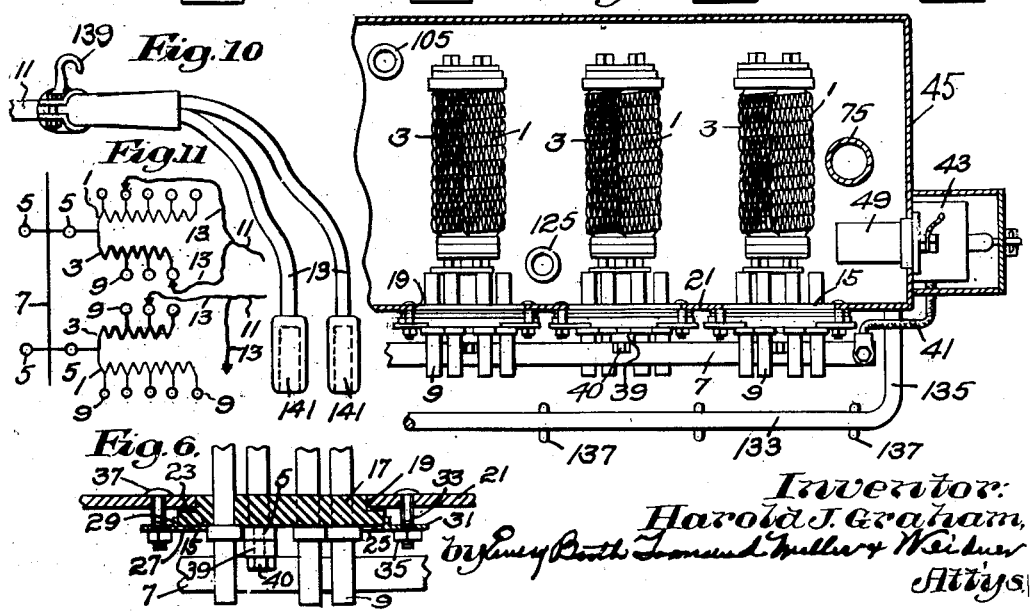
Inventor:
Harold J. Graham,
Attys.

Patented Oct. 12, 1943

2,331,773

UNITED STATES PATENT OFFICE 2,331,773

CURRENT REGULATING APPARATUS FOR ELECTRIC ARC WELDING CIRCUITS

Harold J. Graham, Boston, Mass.

Application June 16, 1942, Serial No. 447,218

2 Claims. (Cl. 201—63)

My invention relates to current regulating apparatus for electric arc welding circuits.

The present invention, which constitutes an improvement on the current regulating apparatus forming the subject matter of applicant's co-pending application Serial Number 435,596, filed March 21, 1942, will be best understood from the following description when read in the light of the accompanying drawings of an embodiment of the invention, the scope of which latter will be more particularly pointed out in the appended claims.

In the drawings:

Fig. 1 is an elevation, with parts in section and parts broken away, of apparatus according to the invention;

Fig. 2 is a section on the line 2—2 of Fig. 1;

Fig. 3 is an end elevation of the apparatus according to Fig. 1 as viewed from the right, with parts omitted;

Fig. 4 is a section on the line 4—4 of Fig. 2, with parts omitted;

Fig. 5 is a fragmentary section on the line 5—5 of Fig. 3;

Fig. 6 is a section on the line 6—6 of Fig. 1, with parts omitted;

Fig. 7 is a section on the line 7—7 of Fig. 2, with parts omitted;

Fig. 8 is a section on the line 8—8 of Fig. 4, with parts omitted;

Fig. 9 is a section on the line 9—9 of Fig. 2, with parts omitted;

Fig. 10 illustrates details of an end of a welding rod lead; and

Fig. 11 is a schematic wiring diagram.

As pointed out in the above mentioned co-pending application, in electric arc welding, particularly with the so-called metallic arc, the heat of the arc must be varied to suit the character of the work as, for example, when welding thick plates a higher temperature arc commonly is required than when welding thin plates. The temperature of the arc is determined by the current flowing, the higher this temperature the greater the current necessary. The potential drop through the arc will vary with the length of the arc, that is to say, with the distance the workman holds the tip of the welding rod from the work. However, in practice this distance, it has been found, does not vary very much, the average drop through the arc when a metallic electrode is employed being about 30 volts and not varying very much when the rod is in the hands of different workmen. Therefore when a constant potential generator is employed as the source of current supply the current supplied the welding rod may be regulated by placing selected resistances of different value between and in series with the generator and welding rod lead.

As in the apparatus forming the subject matter of the above mentioned co-pending application, the present invention employs a plurality of pairs of resistances 1 and 3 (Fig. 11), each pair having a common terminal 5 connected to a bus-bar 7, which latter is connected to a terminal of the generator (not shown), the other terminal of which latter, as well as the work on which the arc is struck, being grounded. Each resistance is provided with taps 9, while the welding rod leads 11 have branches 13, each of which latter is adapted to be connected to the taps for inserting a variable resistance in series with the lead between the latter and the bus-bar 7.

Assuming, for example, that a 60 volt generator is employed, and the drop through the arc is 30 volts as above explained, then the drop through the fraction of each resistance 1 and 3 in series with either branch 13 of the welding rod lead must also be 30 volts. From the formula $E=IR$ the necessary values of the fractions of the resistances between the several taps 9 may be readily computed, it being understood that when both branches 13 are connected to a resistance the value of the current flowing in the lead 11 will be the sum of the values of current flowing through the two branches. In practice the resistances 3 may be of such ohmic value and may be so divided by the taps 9 associated therewith as to cause 10, 20, 30, 40 or 50 amperes to flow in the branch 13 connected to that resistance depending upon to which tap the branch is connected. Similarly the other resistance 1 may be of such ohmic value and may be so divided by the taps 9 associated therewith as to cause 50, 100 or 150 amperes to flow in the branch 13 connected to that resistance depending upon to which tap the branch is connected. In this way by connecting either or both branches of the welding rod lead to the taps of the pair of resistances 1 and 3 all values of current from 10 to 200 amperes by increments of 10 amperes may be caused to flow in the welding rod lead under the conditions above mentioned.

The resistances 1 and 3 may be identical with those illustrated and described in the above mentioned co-pending application, and therefore need not herein be further described with any more particularity than necessary to describe how they coact with other features. Briefly, each resistance consists of a bare coil of resistance wire, the pairs of resistances 1 and 3 together with the associated taps 9 and terminal 5 being carried by a disk-like plate 15 of insulating material such as Bakelite. This plate as shown (Fig. 6) has a reduced diameter portion 17 which is received in a circular opening 19 formed in the vertical side wall 21 of a container for an insulating liquid, in which liquid the resistances are immersed in contact therewith. For making a fluid tight joint between the plate 15 and the wall of the container there is interposed between the latter and the annular rim portion of the plate a suitable gasket 23. For detachably securing the plate 15 to the wall 21 of the container are shown ring members 25 (Figs. 1 and 6) which are L-shaped in cross-section so as to provide annular portions 27 and 29 jointly embracing the outer peripheral corners of the plate. These ring members, as shown, have perforated ears 31 through which extend screw-threaded lugs 33 provided with removable nuts 35. Conveniently the studs may extend through perforations in the wall 21 of the container and be welded thereto at its inner side, as indicated at 37 in Fig. 6, in a fluid tight manner.

As clearly indicated in Figs. 1, 4 and 5, two superimposed rows of plates 15, and associated resistances 1 and 3 and taps 9, may be provided. The bus-bar 7 hereinbefore referred to may extend longitudinally between said rows, the bus-bar having laterally extending lugs 39 integrally formed therewith and secured by bolts 40 (Figs. 1 and 6) to the terminals 5, the construction in this respect being substantially identical with that described in the above mentioned co-pending application.

As shown, the bus-bar 7 is connected by a cable 41 to one terminal of a circuit breaker 43 carried by the end wall 45 of the container, the other terminal of the circuit breaker being connected to the ungrounded terminal of the generator by the cable 47. This end wall 45 of the container may also carry a suitable thermostatic switch 49 extending into the container for tripping the circuit breaker when the liquid contents of the container reach an excess temperature, the circuit arrangement being identical with that described in the above mentioned co-pending application.

As shown, supported on the top wall 51 of the liquid container at each end thereof is a radiator 53. These radiators may be of any suitable construction and, as shown, each comprises an upper header 55 and a lower header 57 connected by a plurality of finned tubes 59. As illustrated, the headers and side walls 61 of the radiators form a square or rectangular opening about the edges of which is welded a wind tunnel 63. As clearly illustrated in Figs. 1 and 4, the edges 65 of this tunnel adjacent the radiator form a square or rectangular opening corresponding to the shape of the opening in the radiator, while the walls of the tunnel are tapered and flared to form at its opposite end a circular opening 67 which surrounds the blade of a fan 69. Between the two fans 69 is positioned an electric motor 71 supported on the top wall of the container, this motor having a rotary shaft 73 extending from opposite ends thereof carrying the fans so that the motor may drive them.

For securing the radiators to the container, and placing the lower headers 57 thereof in communication with the bottom portions of the container at the ends of the latter adjacent the radiators, the headers 57 have secured to their under sides pipes 75 which extend vertically through openings in the top wall of the container and terminate adjacent the container bottom wall 77. As shown, each pipe 75 has a flanged end 79 (Fig. 8) surrounding an opening 81 in the bottom wall of the radiator header 57, the adjacent portion of the pipe being of slightly enlarged diameter and screw-threaded as indicated at 83. Between the flange 79 and the top wall 51 of the container is placed an annular packing gasket 85. For compressing the gasket, and securing the pipe to the top wall of the container, the screw-threaded portion of the pipe carries a suitable nut 87 resting against the under side of the wall 51. This nut and the associated lock nut 89 may be inserted through one of the openings in the container side wall 21 provided for the resistances, and then be slipped over the lower end of the pipe onto the screw-threaded portion thereof.

As shown, the upper header 55 of each radiator is connected by a pipe 91 leading to the middle portion of the container adjacent its side walls 21 and 93, respectively. These pipes may be in two sections detachably connected by a rubber or other flexible hose 95, the metallic portions of the pipe at opposite sides of the hose being welded at their ends to the radiator header 55 and the top wall 51 of the container, respectively, about suitable openings formed therein for placing the headers in communication with the container.

As shown, the upper header 55 of each radiator is provided with a dome 97, the top of one of which is closed while the other is provided with a removable cap 99 so as to serve as a filling orifice for the liquid system. The two domes may be connected by an overflow and vent pipe 101 having a branch connection 103 for discharge of air and liquid from the system. This branch connection 103, as illustrated in Figs. 2 and 9, may discharge into a pipe 105 extending through the container from the top wall 51 to the bottom wall 77 thereof, the pipe at opposite ends being welded to said walls in a fluid tight manner. The fluid discharge from the connection 103 into the pipe 105 in an obvious manner will discharge through the bottom wall of the container, which wall is raised from the floor by suitable supporting legs 107.

For attachment of the device to a hoist or other instrumentality for supporting it during transportation is shown a U-shaped member the legs 109 of which are welded at their lower ends to the top wall 51 of the container, while the bridge portion 111 of this member has secured thereto the shank of an eye-bolt 113 adapted to be secured to a hoisting cable or the like.

As illustrated, the radiators and associated parts carried by the container are housed and protected by a casing 115, which casing may be detachably secured by removable stud bolts 117 (Fig. 7) to the upstanding webs of angle-irons 119 over which the lower edges of the box-like casing fit, the horizontal legs of these angle-irons being welded to the top wall 51 of the container about its periphery. As shown, the casing is provided with a suitable opening 121 adjacent the eye-bolt 113 to permit removal of the casing, and with a suitable opening 123 to permit removal of the cap 99 without removing the casing. Conveniently the leads for the fan motor may be conducted to the interior of the casing from beneath the container through a pipe 125 in all respects similar to the pipe 105 (Fig. 9) hereinbefore described. Entrance of air to the casing is afforded by the horizontal louvers 127, while the ends of the casing are provided with openings 129 for discharge of the air passing through the radiators, these openings being covered by suitable bars 131 welded at opposite ends to the casing for protecting the radiators while the device is being transported from place to place.

For protecting the projecting taps or contacts 9, and associated parts, from damage while the device is being transported the device, as shown, is provided with three spaced U-shaped bar members 133 the body portions of which are spaced from and extend over the side wall 21 of the container from end to end thereof, the end legs 135 of these members being welded to this side wall at the end portions thereof. As shown, these members carry a series of spaced rings 137 for engagement by hooks 139 (Fig. 10) carried at the end portions of the welding rod leads 11, so as to prevent tension on said leads from being imparted to the contacts 9 received by sockets 141 at the ends of the branches 13 of the leads, these sockets being of any suitable construction as, for example, that illustrated and described in the above mentioned co-pending application.

The liquid employed may be any suitable insulating liquid such as transformer oil, or the hydrocarbon liquid commonly employed in automobile radiators, or, when there is no danger of freezing, even distilled water.

By connecting the radiators as above described, thermosiphonic circulation of the liquid is caused through the radiators, the rate of flow of the liquid and hence the heat dissipated varying automatically and directly with the heating effect on the liquid by the resistance elements, which acts to prevent too great a variation in the temperature of the liquid as the number of resistances in use are increasd or diminished, it being understood that if the temperature of the liquid changes too much the temperature characteristic of the resistances will cause an unsatisfactory change in the current forming the welding arc. Preferably the volumetric capacity of the container and total amount of liquid employed are relatively large so as to be sufficient to prevent material cooling thereof and hence cooling of the resistances during periods of interruption of the welding operation say, for example, when an almost consumed welding rod is replaced by a new welding rod, or the welding rod is otherwise being changed. It has been found that if a resistance in circuit with a welding rod lead is permitted to cool during such interruption of the welding operation, as would occur were it air cooled or the amount of liquid employed of sufficiently small volume, the correct amount of current will not flow through the resistance because of its temperature characteristic when the welding operation is restarted, and this effect in the past has caused serious difficulty and much loss of valuable time particularly in the shipbuilding industry for which devices of this kind are particularly suitable.

As an example of the volume of liquid employed, but without limitation thereto, it is mentioned that satisfactory results have been secured, when employing 10 resistances of the current capacities above mentioned, with a container about 37 inches long, 12 inches wide, and 16 inches high, which container has a capacity of about 22 U. S. gallons after allowing about 6 gallons displacement for the resistance elements and other liquid displacing parts within the container, the remainder of the liquid system having a capacity of about 4 gallons. It has also been found that improved results are secured in maintaining the liquid and the resistances at the desired temperature by employing a plurality of radiators each of which has its intake and outlet connected to the container in such way as to predominantly take care of groups of resistances as, for example, having one radiator take care of one-half the resistances and the other the other half as in the device illustrated. If only the resistances at one end of the tank, for example, are in use it has been found that a better control of the temperature will be secured by having the radiator take care of the liquid at that end than would be the case if a single radiator were employed having its intake and outlet connected to opposite ends of the container.

It will be understood that, within the scope of the appended claims, wide deviations may be made from the forms of the invention described without departing from the spirit thereof.

I claim:

1. Current regulating apparatus for a plurality of electric arc welding circuits having, in combination, a liquid container; a plurality of exposed resistance elements received by said container so that said elements may be immersed in a body of liquid in contact therewith; terminals for said resistance elements adapting a plurality of welding rod leads to be connected in parallel to a common source of welding current through separate resistance elements; and thermosiphonic liquid circulating means for such liquid including a heat radiator provided with an inlet and an outlet connected to the liquid receiving space of said container at different levels in respect to said space, through which radiator such liquid may flow, whereby the rapidity of such circulation and heat dissipated by said radiator will vary directly with the heating effect of the resistance elements on said liquid.

2. Current regulating apparatus for a plurality of electric arc welding circuits having, in combination, a liquid container; a plurality of exposed resistance elements received by said container so that said elements may be immersed in a body of liquid in contact therewith; terminals for said resistance elements adapting a plurality of welding rod leads to be connected in parallel to a common source of welding current through separate resistance elements; and thermosiphonic liquid circulating means for such liquid including a heat radiator provided with an inlet and an outlet connected to the liquid receiving space of said container at different levels in respect to said space, through which radiator such liquid may flow, whereby the rapidity of such circulation and heat dissipated by said radiator will vary directly with the heating effect of the resistance elements on said liquid, the volumetric capacity of said container and liquid circulating means being sufficiently large to prevent material cooling of said liquid during periods of interruption of heating of the liquid incident to changing welding rods.

HAROLD J. GRAHAM.